United States Patent Office 3,207,721
Patented Sept. 21, 1965

3,207,721
POLYVINYL CHLORIDE COMPOSITIONS CURED WITH A COBALT HALIDE
Moyer M. Safford, Schenectady, N.Y., assignor to General Electric Company, a corporation of New York
No Drawing. Filed June 5, 1963, Ser. No. 285,612
5 Claims. (Cl. 260—30.6)

This invention is concerned with making solid, infusible, insoluble, plasticized vinyl halide resins. More particularly, the invention relates to a process for rendering solid vinyl chloride resins plasticized with tricresyl phosphate, insoluble and infusible by heating the latter in the presence of a minor weight proportion of a cobalt halide. The invention also embraces a vinyl chloride resin capable of being rendered infusible and insoluble by the presence of the aforesaid cobalt halide as well as the heat-treated products therefrom to yield the cross-linked, i.e., the infusible, insoluble vinyl chloride resins. For brevity, the term "cobalt halide" in the specification and claims is intended to include both the anhydrous cobalt halides and hydrated cobalt halides.

Plasticized vinyl halide resins, for instance, plasticized polyvinyl chloride resins, have been employed extensively as insulation for electrical conductors. The use of such insulated conductors has been limited as far as temperature is concerned, to the point where the plasticized vinyl chloride resin begins to flow and thereby loses its ability to continue as insulation for the metallic conductor. Depending on the environmental conditions, this temperature at which the vinyl chloride resins cease to be useful as insulation is of the order of about 75 to 100° C., depending in great measure on the particular vinyl chloride resin and on the type and amount of plasticizer used with the vinyl chloride resin. Attempts have been made in the past to render vinyl chloride resins substantially infusible and insoluble. For the most part, these attempts have not been too successful. In the first place, the temperature at which these allegedly cross-linked vinyl chloride resins can be used has generally not been high enough. In addition, past cross-linking agents have required excessively long periods of time to effect the desired degree of infusibility and insolubility of the vinyl chloride resin. Furthermore, the degree and quality of cross-linking is often adversely affected when certain plasticizers are used with certain classes of cross-linking agents.

Unexpectedly, I have discovered that cobalt halides can readily convert vinyl chloride resins to the substantially insoluble and infusible state and that the amount of cross-linking agent for this purpose is relatively small, while the times required to effect this conversion to the insoluble and infusible state are acceptable for commercial utilization. I have also unexpectedly discovered that the strength of vinyl chloride resins rendered infusible and insoluble with these cobalt halides is advantageously better in kind when tricresyl phosphate is used as the plasticizer for the polyvinyl chloride than when similar plasticizers or more popular plasticizers are used for the purpose.

Two of the more frequently used plasticizers for polyvinyl chloride resins are di-(2-ethylhexyl)phthalate and tricresyl phosphate. I have unpredictedly discovered that the above cobalt halides give much better tensile strengths at temperatures of 150° C. with the tricresyl phosphate than is possible with the di-(2-ethylhexyl)phthalate (also called "dioctyl phthalate"). Even when phosphates similar to tricresyl phosphates were used, such as tri-(2-ethylhexyl)phosphate or tri-(n-butyl)phosphate, or other commonly used plasticizers for vinyl chloride resins such as methyl pentachlorostearate or tetrahydrofurfuryl oleate, where used with the aforesaid cobalt halides, the tensile strengths of the plasticzed polyvinyl chloride at 150° C. were materially lower than when tricresyl phosphate was used as a plasticizer with the cobalt halides. Finally, it was also unexpectedly discovered that I could substitute up to 50 percent of the weight of the tricresyl phosphate with di-(2-ethylhexyl)phthalate without undesirably affecting the tensile strength of the heat-converted plasticized polyvinyl chloride resin. When the amount of di-(2-ethylhexyl)phthalate exceeded 50 percent of the weight of the tricresyl phosphate used with the polyvinyl chloride resin, the tensile strength at 150° C. dropped significantly.

The vinyl chloride resins with which this invention is concerned include not only the homopolymers of vinyl chloride but also copolymers of vinyl chloride with other copolymerizable materials. Among such compositions are (1) vinyl chloride resins, such as, for example, polyvinylidene chloride, polyvinyl chloride resins (including the different molecular weight forms, e.g., gamma-polyvinyl chloride), chlorinated polyethylene (containing from 5 to 60% chlorine), chlorosulfonated polyethylene, chloroprene, etc.; (2) vinyl resins produced by the conjoint polymerization of vinyl chloride and a vinyl ester of a lower saturated aliphatic monocarboxylic acid, e.g., vinyl acetate (such vinyl chloride-vinyl acetate copolymers being available under the trade name of Vinylite resins wherein the vinyl chloride component is present in a preponderant amount), vinyl propionate, vinyl butyrate, vinyl hexoate, vinyl acetobutyrate, vinyl chloroacetate, vinyl chloropropionate, etc., the term "lower saturated aliphatic monocarboxylic acid" preferably embracing acids containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of a vinyl halide, e.g., vinyl chloride, and a vinylidene halide, specifically vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be rendered infusible and insoluble with the above metal halides may be found in, for example, D'Alelio Patents 2,378,753, issued June 19, 1945, and 2,299,740, issued October 27, 1942, both of which are assigned to the same assignee as the present invention.

The amount of cobalt halide which may be employed in the practice of this invention can be varied widely. Amounts as small as 0.1 percent of the cobalt halide, based on the weight of the vinyl chloride resin, can cause an increase in the fusion temperature and reduce the solubility of the vinyl chloride resin in solvents in which the normally thermoplastic vinyl chloride resin is soluble. Advantageously, I employ a minor proportion of the cobalt halide preferably from about 0.1 to about 10 percent, by weight, of the cobalt halide based on the weight of the vinyl chloride resin. The amount of the cobalt halide used will depend on such factors as the application involved (electrical applications usually requiring smaller amounts of the cobalt halide), the amount and type of other ingredients used with the vinyl chloride resins, such as heat and light stabilizers, pigments, fillers, etc., as well as the amount of the tricresyl phosphate used. Ordinarily, no particular problem is involved in the amount of tricresyl phosphate used unless excesive amounts are employed. Preferably, the amount of tricresyl phosphate used may vary, on a weight basis from about 0.1 to 2 parts of the plasticizer per part of the vinyl chloride resin. For many applications, the amount of the plasticizer [i.e., the trecresyl phosphate or the tricresyl phosphate with the di-(2-ethylhexyl)phthalate] employed may vary from about 20 percent to 80 percent, by weight, based on the total weight of the vinyl chloride resin and the tricresyl phosphate. When di-(2-ethylhexyl)phthalate is used with tricresyl phosphate, the amount of the former may range from about 0 to 50 percent (e.g., from 2 to 50 percent), by weight, of the total weight of these two plasticizers.

Among the stabilizers which may be employed in the practice of the present invention may be mentioned, for instance, PbO, $Pb_2O_3$, $Pb_3O_4$, other lead compounds including those disclosed and claimed in Safford Patent 2,269,990, issued January 13, 1942, as well as the lead salt stabilizers disclosed in Safford Patent 2,455,879, issued December 7, 1948.

Among the fillers which may be employed are, for instance, carbon black, silicia, barytes, zinc oxide, clay, wood flour, and other pigments or fillers commonly used in the rubber and plastics industries. The amount of filler can be varied widely and generally is within the range of from about 5 to 200 percent, by weight, of the total weight of the filler, plasticizer, and vinyl chloride resin. Generally, on a weight basis, the filler is advantageously employed from about 0.1 to 2 parts of the latter per part of the vinyl chloride resin.

Generally, in order to carry out the invention, it is only necessary to mix the plasticizer with the cobalt halide, and this mixture is then dry blended with the vinyl chloride resin, which is then subjected to milling at temperatures of from 110–130° C. (preferably at 125° C.), incorporating at the same time any other modifying agents, such as those mentioned above, and thereafter heating the mixture of ingredients at temperatures in excess of 100° C. and advantageously ranging from about 130–170° C., at times of from 5 to 60 minutes, or more if desired, at pressures of from 100–1000 p.s.i. Because of the reactivity of the cobalt halide, the vinyl chloride resin composition should be molded as soon as possible after the cobalt halide is incorporated.

In order that those skilled in the art may better understand how the present invention may be practiced, the following examples are given by way of illustration and not by way of limitation. All parts are by weight. In all cases, the vinyl chloride resin was solid gamma polyvinyl chloride.

EXAMPLE 1

A homogeneous mixture was obtained on milling rolls from 60 parts polyvinyl chloride resin (obtained by polymerizing vinyl chloride in the usual fashion) and 40 parts of either tricresyl phosphate or di(2-ethylhexyl)-phthalate. The use of the di-(2-ethylhexyl)phthalate was to demonstrate the advantages in kind to be derived from using the tricresyl phosphate as the plasticizer over the di-(2-ethylhexyl)phthalate alone as a plasticizer. Samples of these formulations were made up in which 2 parts of a cobalt chloride was incorporated in each of the formulations in the manner described above. As a control, mixtures of the polyvinyl chloride resin and each of the two plasticizers without the cobalt chloride were also prepared. Each of the samples both with and without the cobalt chlorides was pressed at a temperature of 150° C. at a pressure of about 500 p.s.i. for 30 minutes into the form of sheets and these sheets were then tested for physical properties at 150° C. Table I below shows the properties of the molded samples at the aforesaid test temperature.

*Table 1*

| Sample No. | Cobalt chloride | Plasticizer | Tensile, p.s.i. | Percent elongation |
|---|---|---|---|---|
| 1 | Control* | Tricresy phosphate | 30 | |
| 2 | ----do---- | Di-(2-ethylhexyl)-phthalate. | 40 | |
| 3 | $CoCl_2.6H_2O$ | Tricresyl phosphate | 336 | 150 |
| 4 | $CoCl_2$ (anhydrous). | ----do---- | 269 | 145 |
| 5 | $CoCl_2.6H_2O$ | Di-(2-ethylhexyl)-phthalate. | 36 | 105 |
| 6 | $CoCl_2$ (anhydrous). | ----do---- | 54 | 98 |

*No cobalt chloride.

EXAMPLE 2

The unpredictability of being able to effect crosslinking of the vinyl chloride resin by means of the cobalt halides is illustrated by the fact that when one employed other metallic halides which might be expected to be equally as effective, for instance, 2 parts of aluminum trichloride or 2 parts of boron trifluoride in place of the 2 parts cobalt chloride (whether hydrated or anhydrous) of Example 1, the results were as shown in Table II below.

*Table II*

| Sample No. | Metal halide | Physicals tested at 30° C. | | Physicals tested at 150° C. | |
|---|---|---|---|---|---|
| | | Tensile, p.s.i. | Percent elongation | Tensile, p.s.i. | Percent elongation |
| 7 | $AlCl_3$ | 2,977 | 200 | 48.9 | 118 |
| 8 | $BF_3$ | 3,217 | 235 | 88.1 | 129 |

EXAMPLE 3

In order to show the specificity of the cobalt halides with tricresyl phosphate as a plasticizer, other formulations were prepared and cured similarly as was done in the previous examples using two types of plasticizers quite closely related to tricresyl phosphate, and the physical properties of such cured samples were determined at 150° C. The basic formulation comprised 60 parts polyvinyl chloride, 2 parts cobaltous chloride hexahydrate, and 40 parts of the respective plasticizer used. Each formulation was heated for 30 minutes at 150° C. at a pressure of 500 p.s.i. to yield sheets which were tested at 150° C. for tensile strength and percent elongation with the results described in Table III.

*Table III*

| Sample No. | Plasticizer | Tensile, p.s.i. | Percent elongation |
|---|---|---|---|
| 9 | Tri-(2-ethylhexyl)phthalate | 66 | 80 |
| 10 | Tri-(n-butyl)phosphate | 133 | 42 |

EXAMPLE 4

This example illustrates the effect of varying the proportion of di-(2-ethylhexyl)phthalate with the tricresyl phosphate in combination with polyvinyl chloride containing a cobalt halide as the curing agent. More particularly, 58 parts of polyvinyl chloride was mixed with varying proportions of tricresyl phosphate and di(2-ethylhexyl)phthalate employing 2 parts cobaltous chloride hexahydrate as the curing agent. Each mixture of ingredients was then heated at 150° C. for 30 minutes at about 500 p.s.i. and the sheets formed pursuant to this curing cycle were then tested for tensile strength and percent elongation at 150° C. The following Table IV shows the various proportions of di-(2-ethylhexyl)-phthalate and tricresyl phosphate used as well as the tensile strengths and percent elongations of each of the samples.

*Table IV*

| Sample No. | Tricresyl phosphate, parts | Di-(2-ethylhexyl)-phthalate, parts | Tensile, p.s.i. | Percent elongation |
|---|---|---|---|---|
| 11 | 20 | 20 | 252 | 176 |
| 12 | 15 | 25 | 187 | 230 |
| 13 | 10 | 30 | 81 | 125 |
| 14 | 5 | 35 | 57 | 100 |

It will of course be apparent to those skilled in the art that in addition to the cobalt halides used above other cobalt halides may be employed without departing from the scope of the invention. Among such cobalt halides may be mentioned cobaltic chloride ($CoCl_3$), cobaltous bromide, cobaltous bromide hexahydrate, cobaltous fluoride dihydrate, cobaltous iodide, etc. Also it is intended that the vinyl chloride resin used can also be varied widely, many examples of which have been given above; no intent should be read into the above description to limit this particular aspect of the claimed invention. Finally, the proportions of the ingredients used as well as the other modifying ingredients and conditions under which the curing is carried out may be varied within wide limits as is clearly pointed out above.

Compositions of the present invention rendered substantially infusible and insoluble can be obtained by various means including extrusion, injection molding, flame spraying, plasma spraying, compression molding, plastisol techniques (e.g., by dipping or slush molding), etc. using adequate heating means for effecting conversion of the originally thermoplastic plasticized vinyl halide resin to the thermoset and infusible state. These compositions can be used as insulation for electrical conductors and can also be used in the preparation of tapes, varnishes (wherein the potentially infusible and insoluble composition with the tin chloride is dissolved in a suitable solvent and after application to the desired surface is heated at elevated temperatures to effect conversion to the infusible and insoluble state), as adhesives, as castings, laminated products, etc. The compositions herein described and claimed can be used for encapsulating electrical components which will be required to have resistance to elevated temperatures, moisture and to solvents.

What I claim as new and desire to secure by Letters Patent of the United States is:

1. A heat-treated composition of matter containing as essential ingredients (1) polyvinyl chloride resin plasticized with tricresyl phosphate which is present, by weight, in an amount equal to from 0.1 to 2 parts of the latter per part of the polyvinyl chloride, and from 0 to 50 percent, by weight, based on the weight of the tricresyl phosphate, of di-(2-ethylhexyl)phthalate, and (2) a cobalt halide present in an amount sufficient to crosslink the polyvinyl chloride resin.

2. A heat-treated composition of matter containing as essential ingredients (1) polyvinyl chloride resin plasticized with tricresyl phosphate wherein the latter is present, by weight, in an amount equal to from 0.1 to 2 parts of the tricresyl phosphate per part of the polyvinyl chloride, and (2) from 0.1 to 10 percent, by weight, based on the weight of the polyvinyl chloride, of cobaltous chloride.

3. A heat-treated composition of matter containing as essential ingredients (1) polyvinyl chloride resin plasticized with tricresyl phosphate wherein the latter is present, by weight, in an amount equal to from 0.1 to 2 parts of the tricresyl phosphate per part of the polyvinyl chloride, and (2) from 0.1 to 10 percent, by weight, based on the weight of the polyvinyl chloride, of cobaltous chloride hexahydrate.

4. A heat-treated composition of matter containing as essential ingredients (1) polyvinyl chloride resin plasticized with tricresyl phosphate wherein the latter is present, by weight, in an amount equal to from 0.1 to 2 parts of the tricresyl phosphate per part of the polyvinyl chloride, and (2) from 0.1 to 10 percent, by weight, based on the weight of the polyvinyl chloride, of cobaltic chloride.

5. A heat-treated composition of matter containing as essential ingredients (1) polyvinyl chloride resin plasticized with tricresyl phosphate wherein the latter is present, by weight, in an amount equal to from 0.1 to 2 parts of the tricresyl phosphate per part of the polyvinyl chloride, (2) from 0.1 to 10 percent, by weight, based on the weight of the polyvinyl chloride, of a cobalt halide, and (3) a filler for (1).

References Cited by the Examiner

UNITED STATES PATENTS

| | | | |
|---|---|---|---|
| 2,117,591 | 5/38 | Alexander | 260—92 |
| 2,157,997 | 5/39 | Brous | 260—92 |
| 3,091,597 | 5/63 | Henriques | 260—41 |

MORRIS LIEBMAN, *Primary Examiner.*